July 5, 1927.

E. E. GREVE 1,634,940

FLEXIBLE SHAFT COUPLING

Filed May 18, 1922

INVENTOR.
E. E. Greve
by W. C. Doolittle
Attorney

Patented July 5, 1927.

1,634,940

UNITED STATES PATENT OFFICE.

EDGAR E. GREVE, OF BELLEVUE, PENNSYLVANIA.

FLEXIBLE SHAFT COUPLING.

Application filed May 18, 1922. Serial No. 561,849.

This invention is for a shaft coupling, and relates particularly to flexible coupling to be interposed between adjacent sections of shaft to transmit motion from one to the other and provide for a certain amount of flexibility between the two, and enable the relative torque in the two shafts to be gauged to some extent.

In my co-pending application, Serial No. 558,194, filed May 3, 1922, I have shown the present form of coupling in a rotary earth boring apparatus for transmitting power through a sectional shaft from a line shaft to a rotary, and have pointed out the advantages of using a flexible coupling in this connection. While the coupling is designed particularly for use in a rotary drilling apparatus to enable the operator or driller to determine, to some extent, the amount of strain on the drill stem, the coupling is adapted for other uses.

The objects of my invention are to provide a coupling of simple and easily made construction, capable of transmitting power in two directions, so that the shaft can be reversed when desired, having yieldable springs therein arranged to change their position with the changing relative positions of the driving and driven parts; to provide balancing springs for the first mentioned springs; and to provide a spherical seat for longtiudinally abuttting parts of the coupling, so that the driving and driven sections of shaft need not be in alinement.

My invention may be readily understood by reference to the accompanying drawings, in which.

Figure 1:
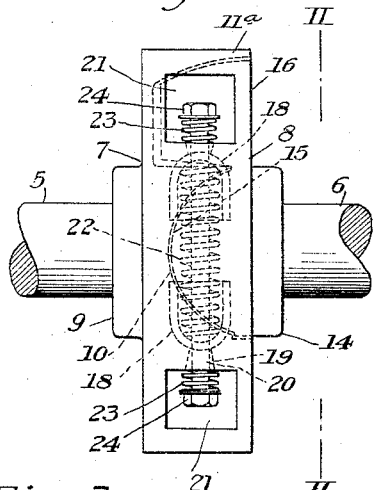
Fig. 1 is a side elevation of a shaft coupling constructed in accordance with my invention.

In the drawing, 5 represents one section of a shaft and 6 the other, and which may be termed the driving and driven sections, respectively. The coupling is comprised of two main members 7 and 8.

Member 7 is keyed to the end of the driving shaft 5 and comprises an integral casting having a hub 9, the inner face of which is rounded, as indicated at 10, to provide a spherical seat. The member 7 is partly hollow and partly solid, the hollow portion being designated as 11 and enclosed in a flange 11ª. The solid portion 12, which is eccentric, is connected with the hub, and at 13 are flat lateral faces which form part of the same chord of a circle whose periphery is defined by the periphery of member 7.

Member 8 is formed of an integral casting, with a hub 14 having a convexed face 15 adapted to fit into and have a spherical seat in concaved face 10 of the member 7. Eccentric of the hub, is a solid projecting element 16 corresponding in shape to the solid portion 12 of member 7. The projection 16 is adapted to fit into the hollowed part 11 of member 7, and formed on this projection are flat lateral faces 17 which are normally parallel to and spaced away from the corresponding face 13 of the solid part of member 7.

Figure 2:
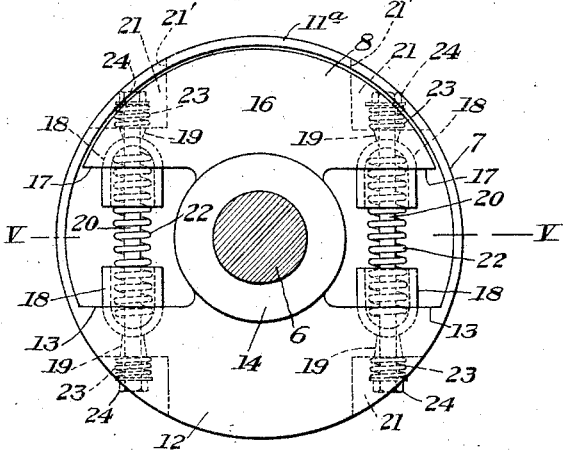
Fig. 2 is an end view of the coupling, showing the shaft in section, the view being taken on line II—II of Fig. 1.
Figure 3:
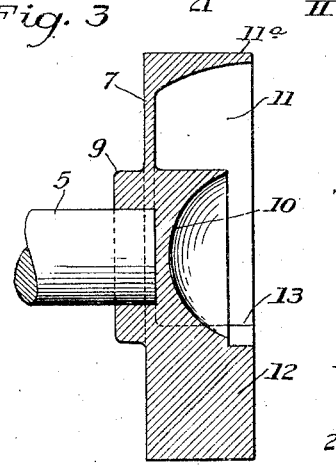
Fig. 3 is a vertical section through one member of the coupling.
Figure 4:
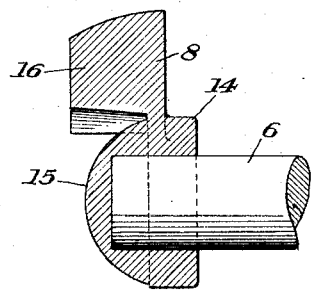
Fig. 4 is a similar view of the other member.
Figure 5:
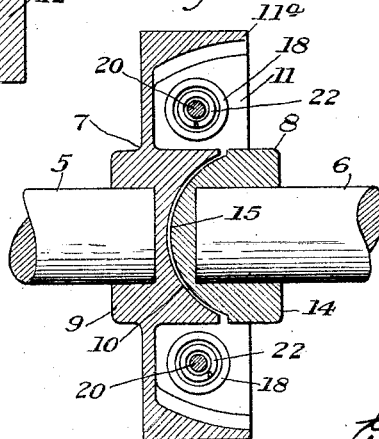
Fig. 5 is a sectional view on line V—V of Fig. 2.

In each of the two offset lateral faces 13 and each of the two lateral faces 17, is a concaved recess in which are mounted cups or spring retainers 18, the cups having rounded faces to engage in the recesses, so a spherical seat or bearing is provided for the cups. Passing through the center of opposed pairs of cups, and through holes 19 in the solid parts of the two members, are rods 20 which are slidable in said holes. The holes are of increasing diameter away from the cups, as shown in Figs. 1 and 2, to allow for angular movements of the rods. The solid parts of the respective members are cut away, as at 21, at their periphery, at the points where the ends of the rods project, and openings 21' in flange 11ª give access to the ends of the rods that project through projecting part 16.

Surrounding each of the two rods, which are normally parallel, is a spring 22. The opposite ends of each spring 22 seat in a cup or retainer 18, as shown. Surrounding the projecting ends of each rod are supplemental springs 23 which are retained in position by nuts 24 on the ends of the rods. Openings 21' allow for sufficient relative movement between nuts 24 at one end of the rods and the flange 12 of member 7.

In operation, the parts are normally in the position shown in Fig. 1. When section 5 of the shaft is rotated, and there is substantially no resistance or load on shaft 6, this position of the parts will maintain. If a load is placed on section 6 of the shaft, one of the inner springs 22 will be placed under compression, due to such spring providing a compressible or yieldable element for transmitting power from one of the coupling members to the other. The direction of rotation of the shafts will determine which of the two inner springs will be compressed. As the spring compresses, one of the faces 13 will approach one of the faces 17.

By reason of the shape of holes 19, rods 20 will not bind. Because of the spherical seats provided for cups 18, the cups may keep in alinement and the springs 22 will not become bowed. As one spring 22 is compressed, the supplemental springs 23 on the other rod will be compressed. There is thus a counter-balancing of the strain and all of the power need not be transmitted through the one compressed spring 22.

By reason of the interfitting concaved and convexed surfaces of the hubs of the two members, a certain lateral freedom of movement exists between the two shaft sections 5 and 6, and it is not essential that both shaft sections be absolutely in longitudinal alinement.

An operator, after some experience, can determine to a certain extent the amount of strain on the driven member by observation of the relative distribution of the coupling members from normal positions. It will be obvious that the coupling will function upon rotation of the shaft in either direction, so that the direction of rotation of the shafts may be reversed from time to time.

I claim as my invention:

1. A shaft coupling comprising a pair of opposed members having cooperating parts forming a spherical joint therebetween, each having a single offset segment-shaped projection thereon, yieldable means interposed between the faces of the segmental projections of the two members, and a movable member passed through the said projections for connecting the opposed members.

2. A shaft coupling comprising a pair of interfitting members, each having a single offset segment-shaped projection thereon, said projections having opposed lateral portions, springs interposed between the opposed faces of the projections, a rod passing through each spring and projecting through the said portions, said rods being slidably and angularly movable relatively to the said portions, and springs surrounding the projecting ends of the said rods.

3. A shaft coupling comprising a pair of opposed members having segment shaped portions thereon, which portions have opposed lateral faces, springs interposed between the opposed faces, cup-like retainers engaging in a spherical seat in all the opposed faces of the segments, and springs having their ends seated in said retainers.

4. A shaft coupling comprising a pair of opposed members having eccentric portions thereon, said portions having opposed lateral faces lying in the same plane, which plane corresponds to a chord of a circle whose center is that of said members, a spring between each pair of opposed lateral faces, a rod passing through each spring and slidably retained and angularly movable in said eccentric portions, and retaining cups for the ends of said springs, each of said cups having a spherical seat in said lateral faces to accommodate for changing relative positions of the springs.

5. A shaft coupling comprising a pair of opposed members having eccentric portions thereon, said portions having opposed lateral faces, a spring between each pair of opposed lateral faces, a rod passing through each spring and projecting through the eccentric portions of the two members, said rods being slidably and angularly movable relatively to said portions, retainers movably seated in the eccentric portions in which the ends of said springs are seated and through which said rods pass, and springs surrounding the projecting ends of said rods and retained in position by means on said projecting ends.

6. A shaft coupling comprising two opposed members having hub portions and each having two lateral faces reversed with respect to one another which are in a plane that is substantially parallel to the axis of any shaft with which the members may be used, the faces of the respective members being opposite, yieldable means interposed between said lateral faces, a concaved seat in the hub of one member, and a convexed face in the hub of the other member adapted to fit into said concaved seat, whereby a spherical joint is provided by the two members.

In testimony whereof I affix my signature.

EDGAR E. GREVE.